United States Patent
Black et al.

(10) Patent No.: US 12,412,412 B1
(45) Date of Patent: Sep. 9, 2025

(54) UNSTRUCTURED DATA IDENTIFICATION AND WORKFLOW EXECUTION USING MACHINE-LEARNING TECHNIQUES

(71) Applicant: THE HUNTINGTON NATIONAL BANK, Columbus, OH (US)

(72) Inventors: Jason W. Black, Columbus, OH (US); Timothy Gorman, Columbus, OH (US); Carrie A. Kubasta, Columbus, OH (US)

(73) Assignee: The Huntington National Bank, Columbus, OH (US)

( * ) Notice: Subject to any disclaimer, the term of this patent is extended or adjusted under 35 U.S.C. 154(b) by 0 days.

(21) Appl. No.: 19/018,479

(22) Filed: Jan. 13, 2025

(51) Int. Cl.
*G06V 30/19* (2022.01)
*G06N 20/00* (2019.01)
*G06V 10/70* (2022.01)

(52) U.S. Cl.
CPC ....... *G06V 30/19147* (2022.01); *G06N 20/00* (2019.01); *G06V 10/70* (2022.01)

(58) Field of Classification Search
CPC ... G06V 30/19147; G06V 10/70; G06N 20/00
See application file for complete search history.

(56) References Cited

U.S. PATENT DOCUMENTS

2022/0189187 A1* 6/2022 Narumi .................... G06T 7/11
2024/0338958 A1* 10/2024 Gong ............... G06V 30/19173

* cited by examiner

*Primary Examiner* — Mark Roz
(74) *Attorney, Agent, or Firm* — Kilpatrick Townsend & Stockton LLP

(57) ABSTRACT

The disclosed techniques are directed to identifying textual data instances depicted within images having an unstructured/undefined format. A machine-learning model may be trained to identify textual data instances within the image and corresponding data types for the textual data instances. The values and/or data types of the textual data instances may be compared to previously-stored data that is associated with a data provider. If the values and/or data types match the previously-stored data, the values corresponding to the textual data instances may be used to execute one or more processes. Executing a process may comprise transmitting one or more data messages that include one or more values of the textual data instances. The disclosed techniques may be executed as part of a monitoring process that obtains images over a time period, detects and validates the textual data instances depicted within those images, and executes one or more additional processes using values extracted from the images.

20 Claims, 9 Drawing Sheets

UNSTRUCTURED DATA IDENTIFICATION AND WORKFLOW EXECUTION USING MACHINE-LEARNING TECHNIQUES

BACKGROUND

There are a variety of contexts in which users must manually enter data from a document at a user interface to later execute an associated workflow. This data entry be a tedious process for the user and the manual nature of process creates unnecessary delay and an elevated risk of user error. Conventional image processing techniques for identifying data within an image may be based on structured and previously-known formats. When similar data is differently formatted in various documents, identifying specific data and where that data is provided within an image is far more complex and error prone. Due to these difficulties, conventional systems lack the ability to execute specific operations, potentially without additional user input, leading to a suboptimal user experience, system execution latency, and an overabundance of user interface management requirements resulting in wasted processing resources.

TECHNICAL FIELD

This disclosure generally relates to data classification and workflow execution particularly to systems, methods, and non-transitory, computer-readable media that may use image processing techniques to classify unstructured data of a variety of data formats. The classified data may be utilized to perform operations, potentially independent of subsequent user input.

BRIEF SUMMARY OF THE INVENTION

Techniques are provided for identifying unstructured data within images using image processing techniques. The identified data may be used for executing one or more subsequent processes. Various embodiments are described herein, including methods, systems, non-transitory computer-readable storage media storing programs, code, or instructions executable by one or more processors, and the like.

One embodiment is directed to a computer-implemented method for identifying and utilizing unstructured data from an input image to perform an automated process. The method may comprise obtaining, by a computing device, a machine-learning model that has been trained to identify a set of textual data instances within an input image and data types corresponding to the set of textual data instances. In some embodiments, the machine-learning model may be previously trained utilizing a machine-learning algorithm and a training data set comprising example images of a plurality of different unstructured formats Each example may identify corresponding textual data instances within an image of an unstructured format of the plurality of unstructured formats and corresponding data types of the corresponding textual data instances. The method may comprise receiving, by the computing device, a first image having a first unstructured format. The method may comprise providing, by the computing device, the first image as input to the machine-learning model. The method may comprise obtaining, by the computing device, first output from the machine-learning model, the first output identifying a first set of textual data instances identified within the first image and a first set of data types corresponding to the first set of textual data instances. The method may comprise obtaining, by the computing device, data associated with a data provider. The data associated with the data provider may be identified by identifying a first textual data instance of the first set of textual data instances based at least in part on a first data type identified for the first textual data instance. The method may comprise determining, by the computing device, whether a second textual data instance of the first set of textual data instances is valid based at least in part on comparing the second textual data instance to the data associated with the data provider. The method may comprise transmitting, by the computing device, a message comprising one or more values corresponding to the first set of textual data instances. In some embodiments, the message may be transmitted based at least in part on determining that the second textual data instance is valid and/or as part of executing an automated process.

In some embodiments, determining whether the second textual data instance of the first set of textual data instances is valid comprises determining whether a value of the second textual data instance matches a corresponding value of the data associated with the data provider.

In some embodiments, determining whether the second textual data instance of the first set of textual data instances is valid comprises: 1) obtaining user input comprising the data that is associated with the data provider, and 2) storing the data that is associated with the data provider for subsequent use.

In some embodiments, the first image is received via an email message or via an application programming interface and from a second computing device different from the computing device.

In some embodiments, the automated process is one of a plurality of automated processes, and wherein the computer-implemented method further comprises: 1) identifying, by the computing device and based at least in part on the data that is associated with the data provider, an approved process type, and 2) based at least in part on determining that the approved process type matches a process type associated with the automated process, selecting the automated process from the plurality of automated processes.

In some embodiments, the method further comprises: 1) receiving, by the computing device, a second image having a second unstructured format, 2) providing, by the computing device, the second image as subsequent input to the machine-learning model, and 3) obtaining, by the computing device, second output from the machine-learning model, the second output identifying a second set of textual data instances identified within the second image. In some embodiments, the first textual data instance of the first set of textual data instances and a second textual data instance of the second set of textual data instances correspond to a common textual data type. The first image and the second image may have different unstructured formats.

In some embodiments, the first image is one of a plurality of images obtained by the computing device over a time period and the computing device obtains the plurality of images based at least in part on receiving user input indicating a periodicity at which images are to be requested from a second computing device.

At least one embodiment is directed to a computing device comprising one or more processors and one or more memories storing computer-executable instructions that, when executed by the one or more processors, cause the one or more processors to perform the method(s) disclosed herein.

At least one embodiment is directed to a non-transitory computer-readable storage medium storing computer-executable instructions that, when executed with one or more processors of a computing device, causes the one or more processors to perform the method(s) disclosed herein.

BRIEF DESCRIPTION OF THE DRAWINGS

Various embodiments in accordance with the present disclosure will be described with reference to the drawings, in which.

DETAILED DESCRIPTION

Figure 1:
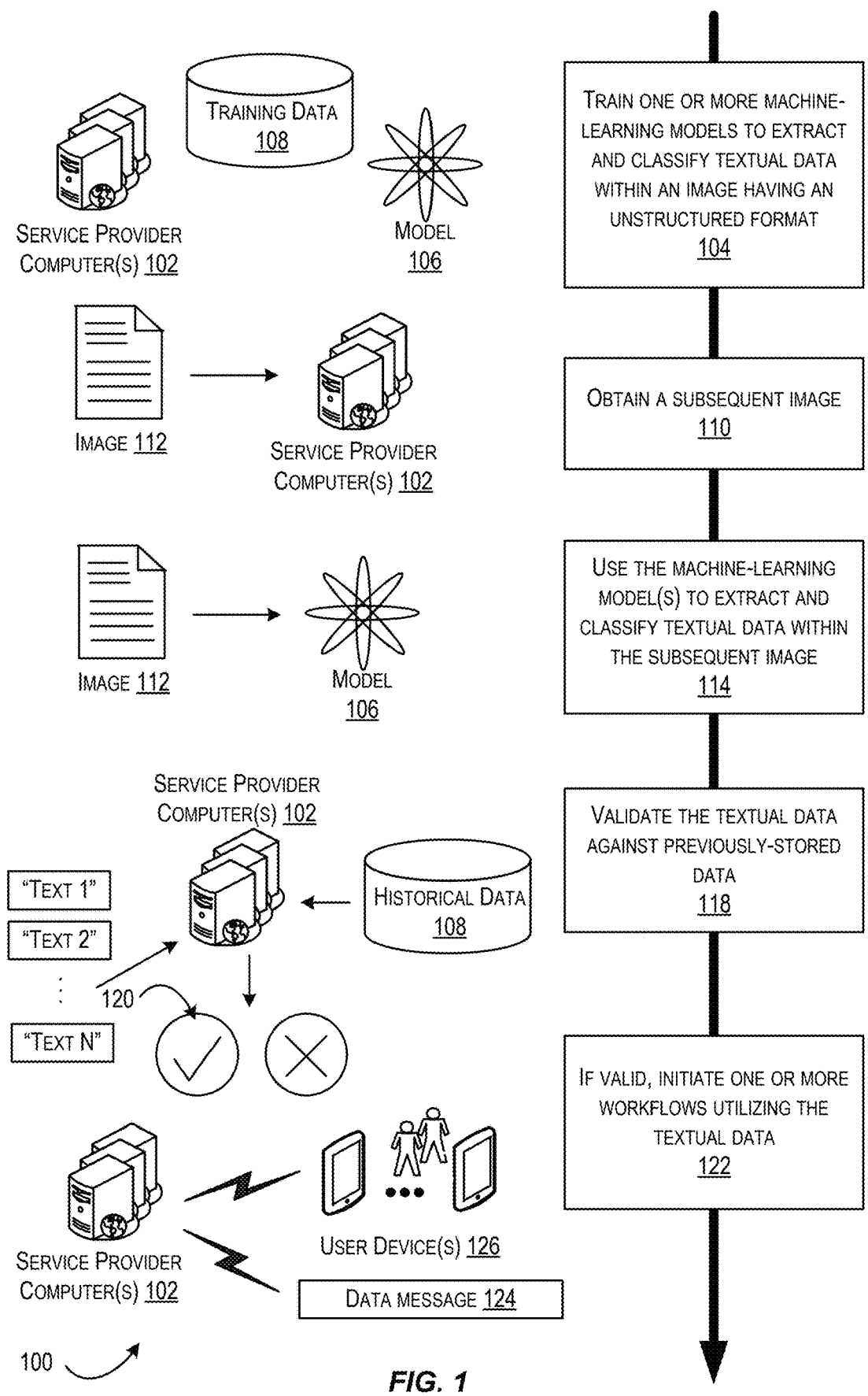
FIG. 1 is an example flow for initiating one or more workflows using data identified from an image having an unstructured format, in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Some or all of the process (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

Techniques are provided for classifying textual data within an image having an unstructured format. Once classified, at least some of this data may be utilized to execute one or more operations corresponding to various workflows. An "unstructured format" refers to a format for which a predefined organization is unknown. It may often be the case that similar data is provided physically or electronically in different formats depending on the data provider. By way of example, the format and/or the content of a document provided by one data provider (e.g., a utility service provider) may substantially differ from the format and/or content of a document provided by another data provider (e.g., a garbage service provider), despite the data provided in these respective documents being similar (e.g., having at least one type of data that is common between the two). Conventional systems lack the ability to accurately identify similar data in images as a result of these differences in content and/or format.

The disclosed techniques disclosed herein provide improvements to extracting text from images that have an unstructured/undefined format. A machine-learning model may be trained to identify locations of text within an image and classify the text at those locations as being associated with one of a predefined set of data types. The classified text may be used to perform a variety of validation operations. By way of example, the classified text may be validated against previously-stored data to identify whether the values identified by the text matches/mismatches previously-stored data. A value identified by at least some text of the image (e.g., a data provider identifier) may be utilized to obtain previously-stored data corresponding to a data provider (e.g., a provider of a physical or electronic document corresponding to the image such as a utility service provider). Any suitable previously-stored data (e.g., data associated with one or more users, data associated with the data provider, etc.) may be used to validate other text/values identified within the image.

When the text/values identified within the image are deemed to be valid (e.g., matched to previously-stored data or when new data is successfully stored), the system may utilize any suitable combination of the text/content identified within the image to perform one or more automated processes. An automated process refers to a process performed by the system, without additional user input or interaction. At any suitable time after initiation of an automated process, user input may be solicited via one or more user interface managed by the system. By way of example, the system may provide an electronic message, a notification, or the like (e.g., via email, via text messaging, etc.) to request confirmation of the text/content identified within the image by the machine-learning model. Confirmations may be used by the system, along with the current text locations and classifications, as an additional example with which the machine-learning model may be updated/retrained, improving the model's accuracy over time.

The disclosed techniques provide a number of technical improvements. By way of example, the disclosed techniques afford a method for generating a robust training data set as part of previously existing workflows that may be used to train a machine-learning model to accurately identify data within images for which no format is previously known or identified. This enables subsequent workflows to be initiated while the process for extracting data with which to perform those workflows from input images is format agnostic. The disclosed techniques improve the user experience by reducing or even eliminating previously required user input and increase the speed and accuracy of operations needed to initiate various workflows. The disclosed techniques are less tedious, more secure, and less prone to user error than conventional input procedures, the enable the performance of periodically executed workflows that were previously unavailable in conventional systems or required substantial user orchestration.

Moving on to FIG. 1 which illustrates an example flow 100 for initiating one or more workflows using data identified from an image having an unstructured format, in accordance with at least one embodiment. The operations discussed in connection with FIG. 1 may be performed with service provider computer(s) 102. The operations discussed in connection with flow 100 may be performed in any suitable order. More or fewer operations than those depicted in FIG. 1 may be employed without diverting from this disclosure.

The flow 100 may begin at 104, where one or more machine-learning models (e.g., model 106) may be trained to extract and classify data within an image having an unstructured/undefined format. The machine-learning models may be trained using supervised or unsupervised learning and a training data set (e.g., training data 108). In some embodiments, such as when supervised learning is employed, training data 108 may include example images of a variety of different and unstructured/undefined formats. Each example of training data 108 may include corresponding textual data instances within the example image and corresponding data types of the corresponding textual data instances. A process for training the machine-learning model is discussed in further detail with respect to FIG. 3 and is not repeated here, for brevity.

At 110, a subsequent image (e.g., image 112) may be obtained by service provider computer(s) 102. By way of example, a user may utilize an application (e.g., a web browser) of their user device (not depicted) to navigate to a website associated with a data provider. Using one or more user interfaces of the website, the user may provide data associated with the service provider. Providing this data may cause the data provider's system to transmit image 112 to service provider computer(s) 102, potentially as part of a periodic transmission process in which the data provider system (not depicted) provides images to service provider computer(s) 102 over time. Providing the image 112 may occur as part of an electronic message (e.g., an email or other suitable message), a function call, an application programming interface call, or the like. As another example, a user may transmit the image in an electronic message or upload the image 112 via a user interface associated with the service provider.

At 114, the machine-learning model (e.g., model 106) may be utilized to extract and classify textual data within the subsequent image obtained at 110. As a non-limiting example, the image 112 may be provided to the model 106 as input data. Subsequent output provided by the model 106 may indicate a variety of textual data instances (e.g., content/data values of the identified text such as "text 1," "text 2," . . . "text N") identified from the image. Each of the textual data instances may be classified with a data type that indicates the data is of a data type selected from a set of predefined data types.

At 118, the textual data may be validated against previously-stored data. By way of example, data corresponding to the data provider may be previously stored (e.g., a part of registration process, due to previously-executed workflows associated with one or more users, etc.). In some embodiments, the values extracted from the image may be compared to the previously-stored data that is associated with the data provider. If the values/data match, the extracted values may be deemed valid (as depicted at 120). In some embodiments, the text/values extracted from the image 112 and their corresponding classifications may be presented at user device(s) 126 to solicit confirmation by a user as to whether the text/values and/or classifications are accurate. In some embodiments, the values/data extracted from the image 112 may be deemed valid only when confirmed by a user at least one time. In some embodiments, once confirmed, subsequent text/values obtained from images provided by the same data provider may be deemed valid without subsequent user confirmation.

At 122, if the textual data is deemed valid at 118, one or more workflows may be initiated utilizing the textual data extracted from the image 112. In some embodiments, a data message (e.g., data message 124) may be generated and presented at user device(s) 126 to solicit confirmation by a user to proceed or abandon transmission of data message 124. As another example, data message 124 may be transmitted to one or more computing systems (not depicted) to perform a data exchange between a user and a data provider.

The operations discussed in connection with FIG. 1 may be performed any suitable number of times. In some embodiments, images may be obtained as part of an ongoing process in which images are obtained from a data provider, data is extracted and classified from the images, and workflows are initiated independent of user input.

Figure 2:
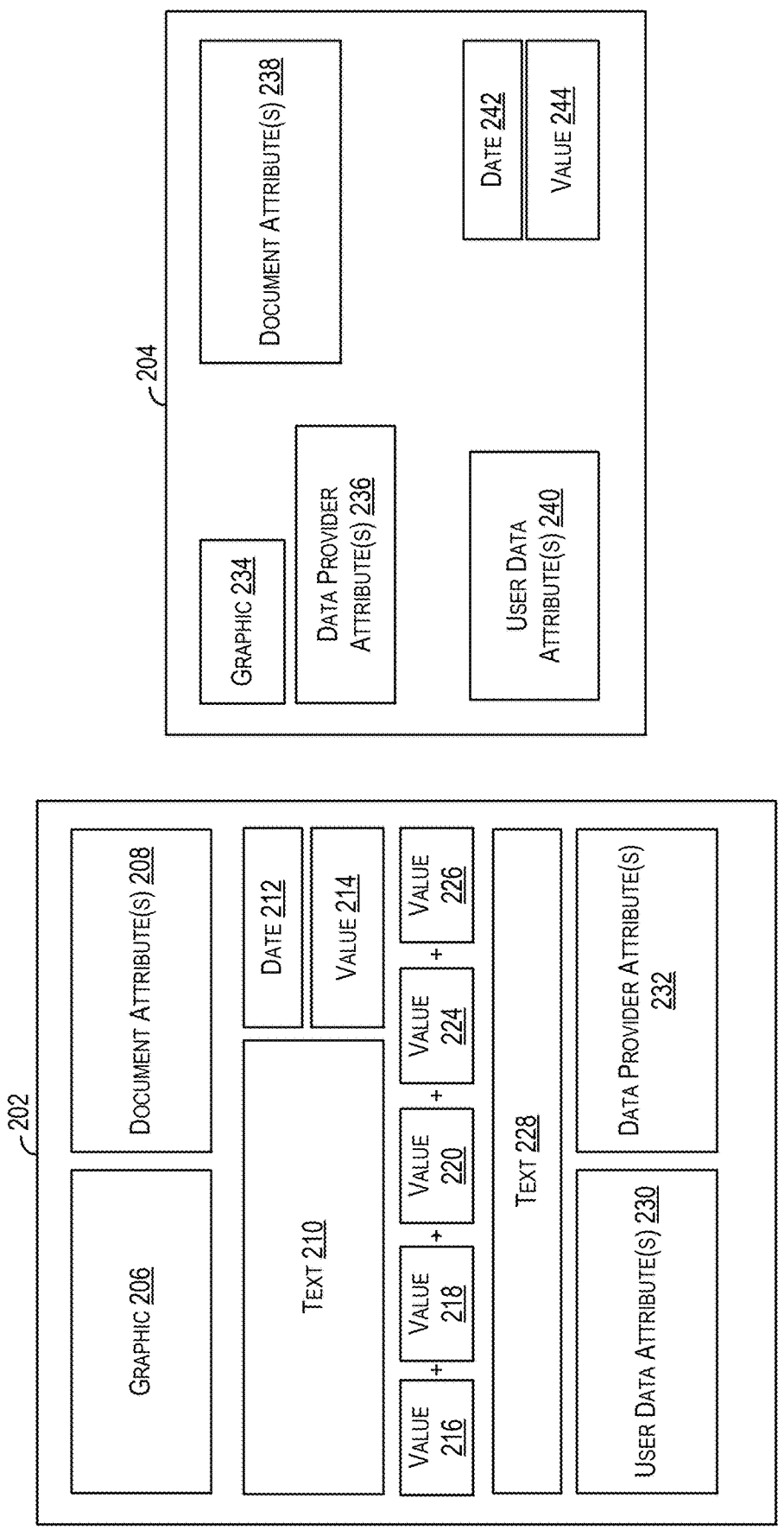
FIG. 2 is a schematic diagram of two example images with unstructured data formats, in accordance with at least one embodiment.

FIG. 2 is a schematic diagram 200 illustrating two example images with unstructured data formats, in accordance with at least one embodiment. As a non-limiting example, images 202 and 204 may individually represent different invoices. Image 202 may be an image of a document generated and/or provided by a first data provider and image 204 may be an image of a document generated and/or provided by a second data provider. In some embodiments, the first and second data providers may be the same data provider or different data providers.

Images 202 and 204 may individually include any suitable data including icons, graphics, pictures, text, symbols, or the like, in any suitable format. The particular data and/or format of the data within each image may be unstructured/undefined or otherwise unknown when the images are obtained/received.

As depicted in FIG. 2, image 202 may include graphic 206, document attribute(s) 208, text 210, date 212, values 214-226, text 228, user data attribute(s) 230, and data provider attribute(s) 232 (collectively referred to as "the data content of image 202"). Document attribute(s) 208, text 210, date 212, values 214-226, text 228, user data attribute(s) 230, and data provider attribute(s) 232 (collectively referred to as "textual data instances of image 202") may include text and the graphic 206 may include non-textual data such as an icon or logo. Image 204 may include graphic 234, data provider attribute(s) 236, document attribute(s) 238, user data attribute(s) 240, date 242, value 244 (collectively referred to as "the data content of image 204"). Data provider attribute(s) 236, document attribute(s) 238, user data attribute(s) 240, date 242, value 244 (collectively referred to as "textual data instances of image 204") may include text and the graphic 234 may include non-textual data such as an icon or logo.

Each of the images of FIG. 2 may be individually provided to a machine-learning model (e.g., model 106 of FIG. 1) as input data. Output from the model may identify the locations of the textual data instances within each image and a classification indicating a corresponding data type for each textual data instances.

It should be appreciated that the locations of textual data instance and classification corresponding to those textual data instances may be identified within each image using the same model, without a predefined format for either image. In some embodiment, similar or the same textual data/data type may be identified in each image by the model, irrespective of the location of the textual data within each image. That is, the model may identify textual data corresponding to date 212 and classify the textual data of date 212 as corresponding to a due date, despite the location, orientation, format, or size of date 212 differing from that of the textual data of date 242 in image 204.

Figure 3:
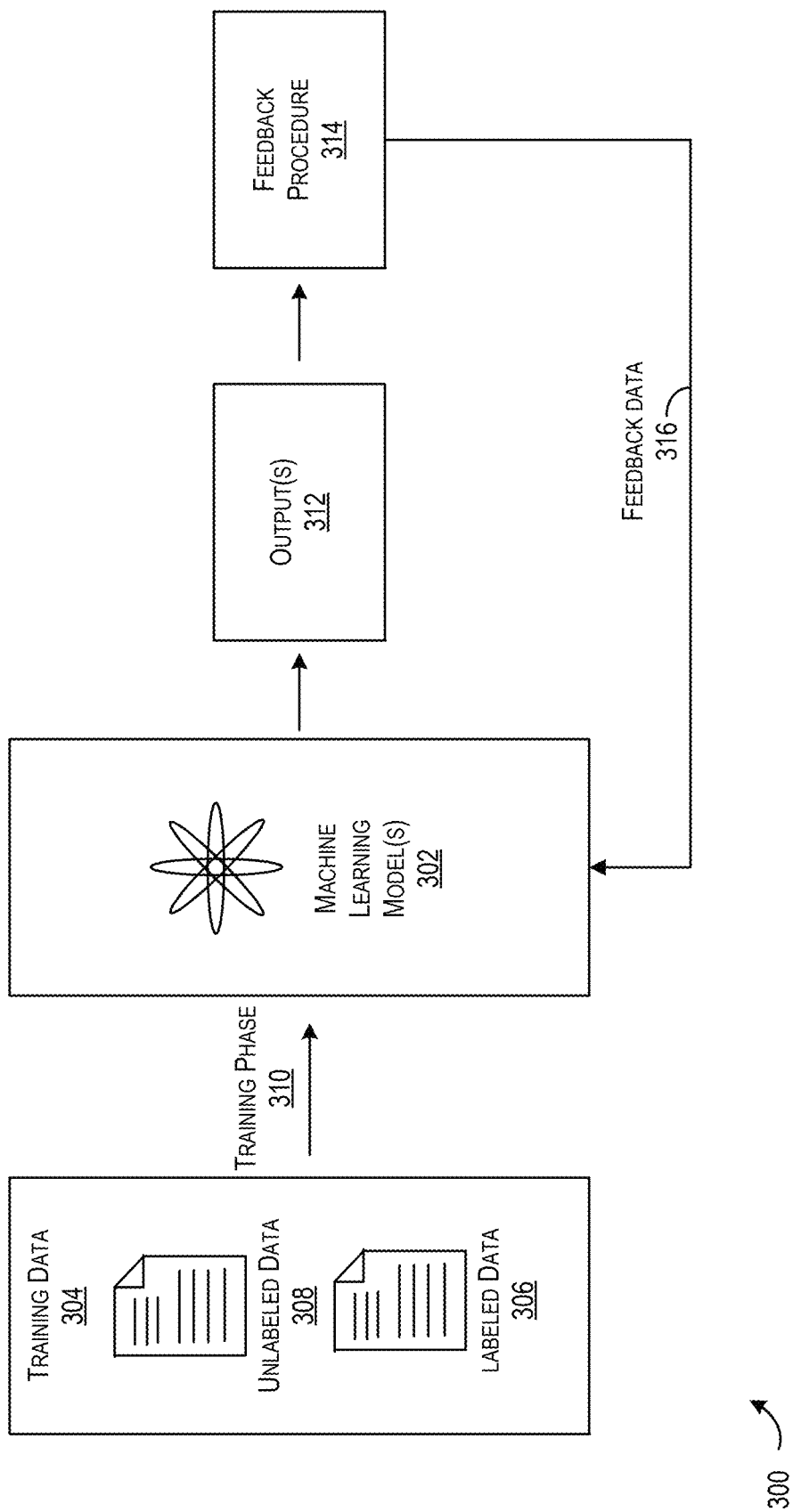
FIG. 3 illustrates a flow for an example method for training a machine-learning model, in accordance with at least one embodiment.

FIG. 3 is a simplified block diagram illustrating an example method 300 for training machine-learning model(s) 302, in accordance with at least one embodiment. In some embodiments, the model(s) 302 (e.g., an example of which includes model 106 of FIG. 1) may be trained using any suitable machine-learning algorithms (e.g., supervised, unsupervised, etc.) and training data 304. A "supervised machine-learning algorithm" refers to a machine-learning task that includes learning an inferred function that maps an input to an output based on a labeled training data set (e.g., labeled data 306) for which example input/output pairs are known. "Unsupervised machine-learning algorithms" refer to a set of algorithms that are used to analyze and/or cluster unlabeled data sets (e.g., unlabeled data 308). In some embodiments, any suitable number of machine-learning model(s) 302 may be trained during training phase 310.

At least one model of machine-learning model(s) 302 may be trained to provide an output associated with a corresponding input. The inputs (e.g., training data 304) can include images of documents from sources including, without limitation, financial institution databases, pharmaceutical databases, medical databases, clinical research databases, marketing databases, or combinations thereof. Labeled data 306 may include any suitable data associated with an image and locations (e.g., bounding boxes, etc.) of one or more textual data instances within the image. A data type corresponding to each textual data instances may be identified and included as part of an example. In some embodiments, the labeled data 306 may include any suitable images of a particular type of document (e.g., a bill, an invoice, etc.) with images of documents that have varying data formats and textual content. In some embodiments, the textual data of different documents may be similar (e.g., may include content corresponding to at least one common data type) but may differ with respect to the particular data types of the data provided, the locations at which the data corresponding to those data types is provided, or the format in which the data corresponding to the data types is provided. User annotations may be included in an example as a data type of content of an image. In some embodiments, user annotations may be provided during a process for manually inputting document data at a user interface managed by service provider computer(s) 102 of FIG. 1. It may be the case that this manual input occurs only once (e.g., the first time a user or any user participates in a process to pay an invoice provided by a specific data provider. During this process, the user may manually identify (e.g., via one or more user interface elements) text values from the image that correspond to a set of data types. By way of example, the user may be asked to identify the textual values corresponding to the data provider's name, a due date, an amount, a previously processed amount, etc.

The machine-learning model(s) 302 can be trained during a training phase 310 using a supervised learning algorithm and labeled data 306 to identify outputs (e.g., output(s) 312) described in the examples above. Output(s) 312 may include data content/values of particular textual data instances identified within the image provided as input and a respective data type that the machine-learning model(s) 302 identified for the textual data instances. Labeled data 306 may be any suitable portion of training data 304 (e.g., training data 108 of FIG. 1, etc.) that can be used to train model(s) to produce the output(s) 312. Using the labeled data 306, a model (e.g., an inferred function) may be learned that maps an input (e.g., an image) to an output (e.g., locations/areas of textual data instances and corresponding data types).

The machine-learning model(s) 302, and the various type of those models discussed above, may include any suitable number of models that are trained using unsupervised learning techniques to identify textual data instances and corresponding data types of the example images provided above. Unsupervised machine-learning algorithms may be configured to learn patterns from data such as untagged data that is unmodified prior to input. In some embodiments, the training phase 310 may utilize unsupervised machine-learning algorithms to generate one or more of the machine-learning model(s) 302. For example, the training data 304 may include unlabeled data 308 (e.g., a name, one or more addresses, one or more amounts, etc.). Unlabeled data 308 may be utilized, together with an unsupervised learning algorithm to segment textual data instances identified in an image of unlabeled data 308 into several groups. The unsupervised learning algorithm may be configured to cause similar textual data instances to be grouped together in a common group based on similar features. An example of an unsupervised learning algorithm may include clustering methods such as k-means clustering, overlapping clustering, probabilistic clustering, and the like. In some embodiments, the unlabeled data 308 may be clustered with the labeled data 306 such that unlabeled instances of a given group may be assigned the same labeled as other labeled instances within the group.

The training data 304 may be utilized during the training phase 310 to train the machine-learning model(s) 302. For example, a percentage of labeled data 306 and/or unlabeled data 308 may be utilized to train the machine-learning model(s) 302. At any suitable time after training, the machine-learning model(s) 302 may be evaluated to assess its/their quality. In a non-limiting example, the accuracy of output(s) 312 with respect to the labels (e.g., the locations and/or data types) identified in labeled data 306 may be assessed. By way of example, a portion of the examples of labeled data 306 and/or unlabeled data 308 may be utilized as input to the machine-learning model(s) 302 in order to generate output(s) 312. Any suitable portion of an example of the labeled data 306 may be provided as input, and the corresponding output (e.g., output(s) 312) may be compared to the label(s) (e.g., textual data instance location and/or data type) already associated with the example (e.g. to provide a measure of fidelity). If some portion (e.g., all, at least a threshold amount) of the output(s) 312 match the example, the output(s) 312 may be determined to be accurate. If the output(s) 312 differ from the example (e.g., at least a threshold amount), the output(s) 312 may be deemed inaccurate. Any suitable number of labeled examples may be utilized, and a number of accurate labels may be compared to the total number of examples provided (and/or the total number of labels previously identified) to determine an accuracy value for a given model that quantifies a degree of accuracy for the model. For example, if eighty out of one hundred and twenty of the input examples generate output labels that match the previously known example labels, the model being assessed may be determined to be sixty-six percent accurate.

In some embodiments, the machine-learning model(s) 302 may be utilized to process subsequent inputs. Feedback procedure 314 may include combining the resultant subsequent output(s) generated by the machine-learning model(s) 302 with the images corresponding to those output(s) (e.g., collectively, feedback data 316) and adding the feedback data 316 to the training data 304 as another training data example and/or using the feedback data 316 to retrain and/or update the machine-learning model(s) 302. In some embodiments, feedback data 316 may be presented to a user and the user may identify whether the values, locations, and data types of the textual data instances identified in the image of feedback data 316 are correct for the given example. The training process depicted in FIG. 3 may be performed any suitable number of times at any suitable interval and/or according to any suitable schedule such that the accuracy of the machine-learning model(s) 302 are improved over time.

Figure 4:
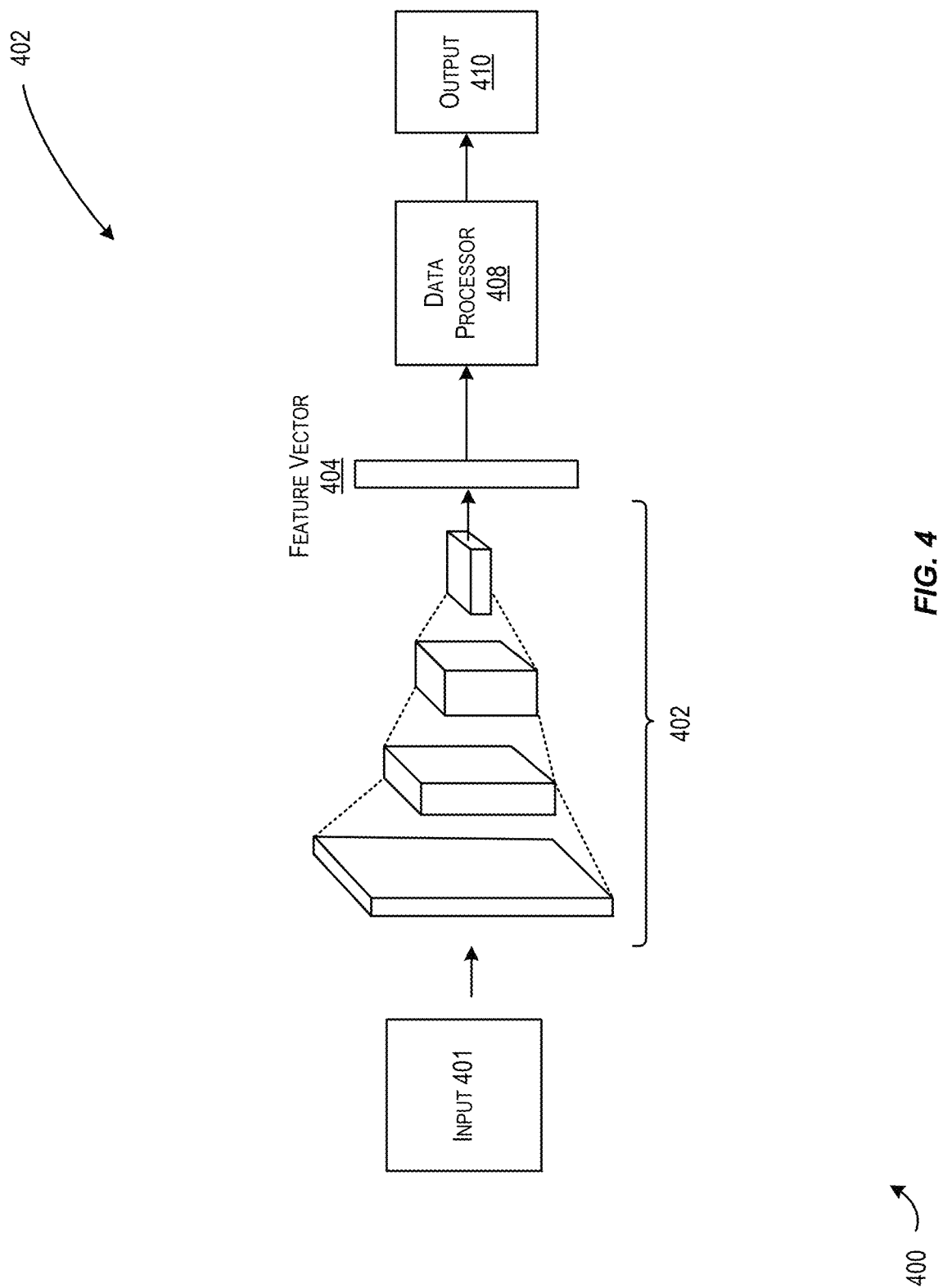
FIG. 4 is a block diagram illustrating a neural network, in accordance with at least one embodiment.

FIG. 4 is a block diagram illustrating a neural network 400, in accordance with at least one embodiment. The neural network 400 may be a Convolutional Neural Network (CNN). Convolutional neural networks are a class of deep neural networks that may be used to identify patterns in images, natural language processing, signal processing and the like. In some embodiments, the neural network 400 may be used to determine a similarity between to images provided as input 401. By way of example, input 401 may comprise an image (a "labeled/processed image") for which values, locations, and corresponding data types for textual data instances depicted within the image are known, and another image (an "unlabeled/unprocessed image") for which values, locations, and corresponding data types for textual data instances depicted within the image are not known. In some embodiments, the neural network 400 may be used to generate feature vectors for images/portions of image of training data 304.

Neural network 400 may include any suitable number of layers. The layers 402 of the neural network 400 may include any suitable convolutional layer (e.g., configured to detect certain features of the input based on one or more filters, a layer that performs a convolution operation to input and passes the result to the next layer), rectified linear unit layers (e.g., configured to remove unwanted numbers such as negative numbers), pooling layers (e.g., layers that take a larger input and distill the input to a smaller form), and flattening layers (e.g., a layer configured to convert two-dimensional arrays from pooled features into a single, long continuous linear vector).

Neural network 400 may be configured to generate feature vector 404 from input 406 by passing input 406 incrementally through layers 402. In some embodiments, input 406 may be an image (e.g., image 202, image 204, an image of a document such as an invoice or bill, etc.).

Data processor 408 may be an example of a transformer. In some embodiments, data processor 408 may be configured with any suitable number of additional layers such as flattening layers (e.g., a layer configured to convert two-dimensional arrays from pooled features into a single, long continuous linear vector), fully connected layers (e.g., layers in which every input of a vector generated by one or more previous layers is connected to a corresponding portion of an output vector), and soft-max layers (e.g., a layer configured to turn values of an output vector to values that, when summed together, add up to 1 or a predefined maximum value). Data processor 408 may be configured to compare feature vector 404 (e.g., a feature vector corresponding to image 202) to another feature vector generated for an image for which values, locations, and corresponding data types for textual data instances depicted within the image are known. In some embodiments, data processor 408 may identify a degree of similarity between the feature vectors based at least in part on any suitable similarity calculation technique. By way of example, a cosine similarity may be calculated using two feature vectors (e.g., a feature vector generated for at least a portion of image 202 of FIG. 2, a feature vector generated for at least a portion of image 204 of FIG. 2, where image 202 is a new image for which values, locations, and corresponding data types for textual data instances depicted within the image are unknown and image 204 is an image for which values, locations, and corresponding data types for textual data instances depicted within the image are known. The data processor 408 may provide the result of the similarity calculation as output 410. The output 410 may be used to determine whether two images match (e.g., whether the whole or respective portions of images 202 and 204 match). The output 410 may be a number between 0 and 1, where the closer the number is to one, the stronger the confidence that the inputs match, whereas the closer the number is to zero, the stronger the confidence is that the inputs do not match. In some embodiments, the inputs may be identified as matching only when the output 410 breaches a predefined threshold (e.g., 0.8, 0.9, etc.).

Although not depicted, neural network 400 may include weights corresponding to each portion of a fully connected layer. These weights express connection strengths between each value and a corresponding category or classification (e.g., output 410 indicating a match or mismatch). Additionally, the neural network 400 may be configured with hyperparameters (not depicted) which may be predefined and user configurable. These hyperparameters may identify how many features are to be utilized for each convolutional layer, what window size or stride is used for each pooling layer, a number of hidden neurons to be used for each fully connected layer, or the like.

In some embodiments, neural network 400 may be initialized with random or predefined weights. Through a training process, the neural network 400 may be trained to identify matches between images provided as input (e.g., as part of input 401). In some embodiments, the neural network 400 may be used to generate feature vector 404 for an image of input 401 (e.g., an image of a document, an image of training data 304 of FIG. 3, image 112 of FIG. 1, etc.). In some embodiments, neural network 400 may be an image encoding backbone (e.g., a ResNet50 or ResNet101 backbone) that is configured to generate feature vector 404 and/or output 410. In some embodiments, the output 410 may comprise feature vector 404 and/or a convolutional feature map (e.g., fixed-length feature vectors, such as feature vector 404, that are derived from the image and mapped to various points of the image). The feature vector 404 of an image may be provided within a training data example (e.g., training data 304 of FIG. 3) with which another model (e.g., model 106 of FIG. 1, machine-learning model(s) 302 of FIG. 3) may be trained. In some embodiments, an image for which values, locations, and/or data types of textual data instances depicted within the image are unknown may be provided to neural network 400 in order to generate a feature vector for that image.

In some embodiments, neural network 400 may be a region-based convolutional neural network (e.g., an "R-CNN") that is configured to take an image as input, identify a textual data instance within the image, and predict a classification (also referred to as a "label," a "classification label," or a "classification") for the identified textual data instance. The label generated may include a single classification label for the textual data instance and/or a distribution of all possible classification labels with corresponding confidence scores indicating a likelihood that the textual data instance is a member of a given data type class (e.g., a data type of a predefined set of data type that indicate what type of data is provided in the textual data instance). Examples of data types include, username, user address information, user contact information, document identifier, invoice identifier, invoice period, due date, current amount owed, last paid amount, an adjustment amount, data provider name, data provider address, data provider contact information, or the like. In some cases, the neural network 400 is a fully convolutional network configured to generate region proposals utilizing a number of anchor boxes, with multiple anchor boxes of differing scales and/or aspect ratios existing for a single region. The neural network 400 may be configured to predict bounding box dimensions and/or coordinates depicted that indicate a location of a textual data instance within the image. In some embodiments, the neural network 400 may include multiple networks. For example, the neural network 400 may include a region proposal network and a second network to use the proposals generated by the region proposal network to detect textual data instances.

Figure 5:
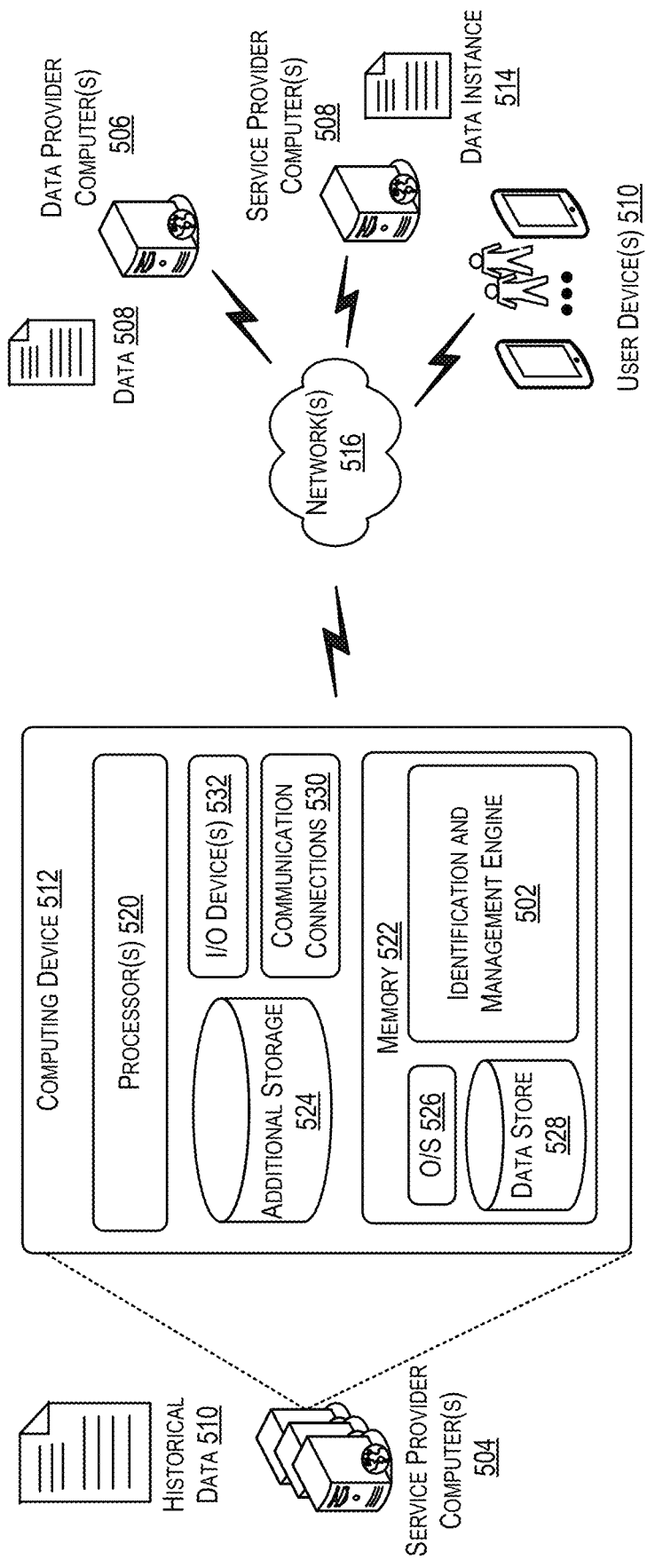
FIG. 5 is a block diagram illustrating an exemplary system comprising an identification and management engine, in accordance with at least one embodiment.

FIG. 5 is a block diagram illustrating an example system 500 including identification and management engine 502, in accordance with at least one embodiment. The system 500 may be used to extract text from an image, validate the text, and initiate one or more workflows using the extract text. System 500 may include service provider computer(s) 504 (an example of service provider computer(s) 102 of FIG. 1), data provider computer(s) 506 (e.g., a system that generates data 507 which may include a document from which image 112 of FIG. 1 may be generated), service provider computer(s) 508, and user device(s) 510. In some embodiments, service provider computer(s) 508 may be a network (e.g., a payment processing network) that is configured to process data instance 514 (e.g., a payment transaction). Service provider computer(s) 504, data provider computer(s) 506 service provider computer(s) 508, and user device(s) 510 may individually include any suitable number of computing device (e.g., computing device 512). The computing device 512 of service provider computer(s) 504 may provide the functionality of identification and management engine 502. The service provider computer(s) 504, data provider computer(s) 506, service provider computer(s) 508, and user device(s) 510 may communicate electronically via network(s) 516.

Computing device 512 may include memory 522. The memory 522 may store computer-executable instructions that are loadable and executable by the processor(s) 520, as well as data generated during the execution of these programs. The memory 522 may be volatile (such as RAM) and/or non-volatile (such as ROM, flash memory, etc.). The computing device 418 may include additional storage (e.g., additional storage 524), which may include removable storage and/or non-removable storage. Additional storage 524 may include, but is not limited to, magnetic storage, optical disks and/or tape storage. The disk drives and their associated computer-readable media may provide non-volatile storage of computer-readable instructions, data structures, program modules, and other data for the computing devices.

The memory 522 and/or the additional storage 524 may be examples of computer-readable storage media. Computer-readable storage media may include volatile or non-volatile, removable, or non-removable media implemented in any method or technology for storage of information such as computer-readable instructions, data structures, program modules, or other data. In some embodiments, memory 522 and the additional storage 524 are examples of computer storage media. Memory 522 and/or additional storage 524 may include, but are not limited to, any suitable combination of PRAM, SRAM, DRAM, RAM, ROM, EEPROM, flash memory or other memory technology, CD-ROM, DVD, magnetic tape, magnetic disk storage or other magnetic storage devices, or any other medium which can be used to store desired information, and which can be accessed by the computing device 512. Computer-readable media may include computer-readable instructions, program modules, or other data transmitted within a data signal, such as a carrier wave, or other transmission. However, as used herein, computer-readable storage media does not include computer-readable communication media.

The memory 522 may include an operating system 526 and one or more data stores 528, and/or one or more application programs, modules, or services. The computing device 512 may also contain communications connection(s) 530 that allow the computing device 512 to communicate with a stored database, another computing device, a server, user terminals and/or other devices (e.g., via network(s) 516). The computing device 512 may include I/O device(s) 532, such as a keyboard, a mouse, a pen, a voice input device, a touch input device, a display, speakers, a printer, etc.

In some embodiments, the memory 522 of service provider computer(s) 504 may store instructions that, when executed by processor(s) 520 implement the functionality described herein with respect to the identification and management engine 502. The identification and management engine 502 may be configured to perform the operations described above in connection with FIGS. 1-4.

Figure 6:
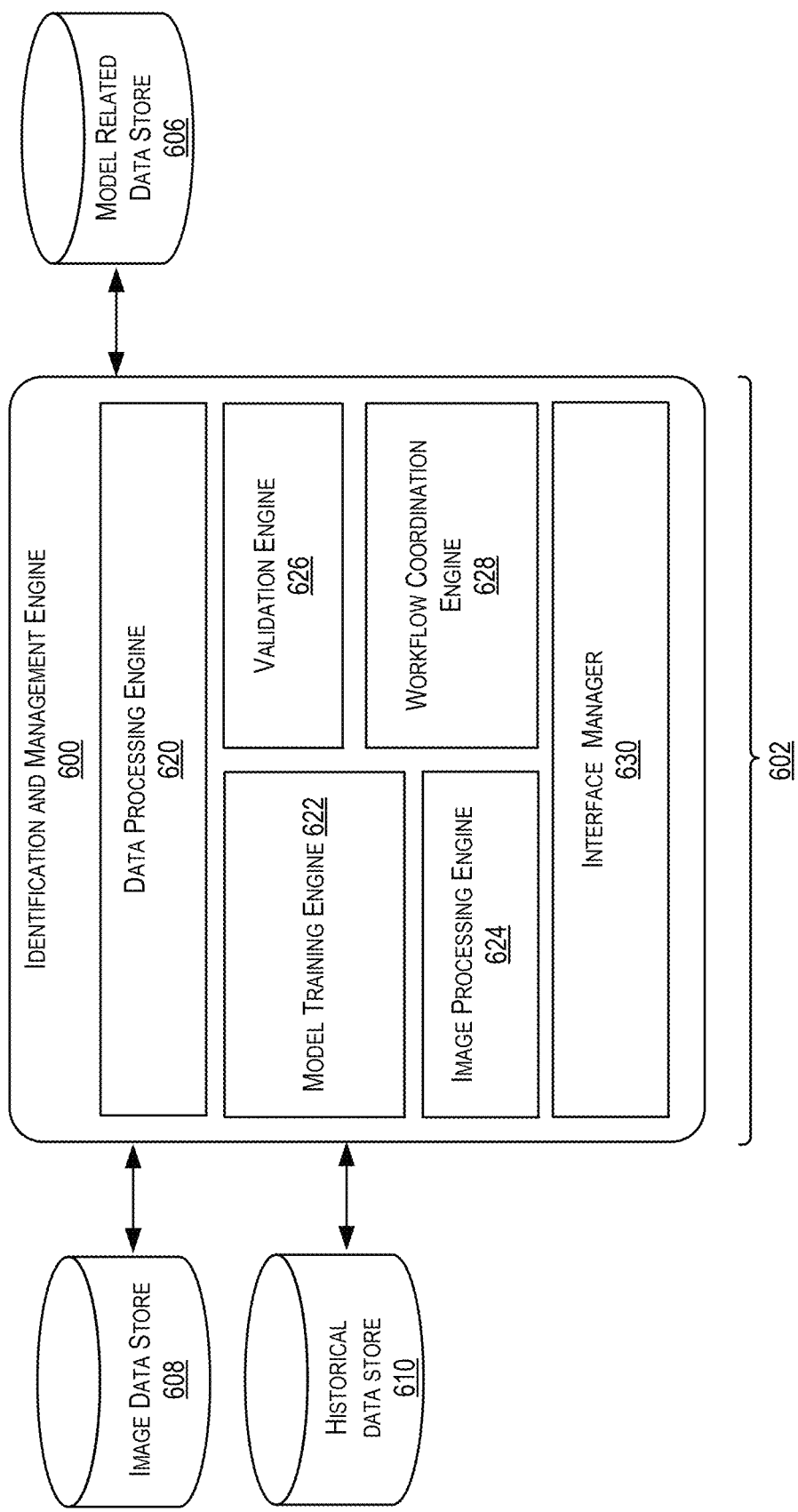
FIG. 6 is a schematic diagram of an example computer architecture for an identification and management engine, including a plurality of modules that may perform functions in accordance with at least one embodiment.

FIG. 6 is a schematic diagram of an example computer architecture for identification and management engine 600 (e.g., the identification and management engine 502 of FIG. 5), including a plurality of modules that may perform functions in accordance with at least one embodiment. Identification and management engine 600 may be executed by any suitable component of the system 500 of FIG. 5 (e.g., the service provider computer(s) 504 of FIG. 5). The identification and management engine 600 may support processes, methods, operations, and techniques described above with respect to any suitable figure discussed herein. The modules 602 may be software modules, hardware modules, or a combination thereof. If the modules 602 are software modules, the modules can be embodied on a computer readable medium and processed by a processor in any of the computer systems described herein. It should be noted that any module or data store described herein, may be, in some embodiments, be a service responsible for providing functionality corresponding to the module described below. The modules 602 may be execute as part of the identification and management engine 600, or the modules 602 may exist as separate modules or services external to the identification and management engine 600. In some embodiments, the modules 602 may be executed by the same or different computing devices, as a service, as an application, or the like.

In the embodiment shown in the FIG. 6, data stores such as model related data store 606, image data store 608, and historical data store 610 are shown, although data can be maintained, derived, or otherwise accessed from various data stores, either remote or local to the identification and management engine 600, to achieve the functions described herein. The identification and management engine 600, as shown in FIG. 6, includes various modules such as a data processing engine 620, model training engine 622, an image processing engine 624, a validation engine 626, a workflow coordination engine 628, and an interface manager 630. Some functions of the modules 620, 622, 624, 26, 628, and 630 are described below. However, for the benefit of the reader, a brief, non-limiting description of each of the modules is provided in the following paragraphs.

Data processing engine 620 may include any suitable processing components (e.g., software, hardware, firmware, etc.) operable to support functions, operations, communications, etc. between one or more of modules 602 and/or data stores 606-610. The data processing engine 620 may function to transmit, receive, and/or otherwise obtain data over one or more communication networks (e.g., network(s) 516 of FIG. 5, including the Internet, wide area networks "WAN", local area networks "LAN", and the like). The data processing engine 620 may be configured to receive or obtain one or more images (e.g., image 112 of FIG. 1) and store those images in image data store 608 and/or transmit those images to any suitable module of modules 602.

The model training engine 622 may be configured with computer-executable instructions that, when executed, stores and/or retrieves a training data set (e.g., training data 304 of FIG. 3) from model related data store 606. The model training engine 622 may be configured to execute one or more relevant machine-learning algorithms (e.g., a supervised machine-learning algorithm, an unsupervised machine-learning algorithm) to train one or more machine-learning model(s) (e.g., the model 106 of FIG. 1, the machine-learning model(s) 302 of FIG. 3, etc.) during a training phase (e.g., the training phase 310 of FIG. 3). Once trained, the machine-learning model(s) may be configured to identify a set of one or more textual data instances (e.g., document attribute(s) 208 of FIG. 2, date 212 of FIG. 2, value 214 of FIG. 2, and the like) within an input image (e.g., image 112) and data types corresponding each of the set of one or more textual data instances (e.g., a user name, a user address, user contact information, a due date, a current amount owed, a previously paid amount, a data provider name, a data provider address, data provider contact information, etc.). The model training engine 622 may be configured to generate output (e.g., output(s) 312 of FIG. 3) from provided training data examples and/or images (e.g., image 112). In some embodiments, the model training engine 622 may perform feedback procedure 314 of FIG. 3 to update the training data. Subsequently the model training engine 622 may update and/or retrain the machine-learning model(s) at any suitable time.

The image processing engine 624 may be configured with computer-executable instructions that, when executed, obtain an image (e.g., image 112) from data processing engine 620 and/or image data store 608 and provides the image to a previously-trained machine-learning model (e.g., model 106, machine-learning model(s) 302, etc.). In some embodiments, the image processing engine 624 may receive output from the machine-learning model that identifies one or more textual data instances depicted within the image, the values corresponding to the textual data instances, the locations of the textual data instances within the image, one or more data types corresponding to each textual data instance, or any suitable combination of the above. In some embodiments, the image processing engine 624 may combine the image and the output obtained from the machine-learning model and provide the combined data to the model training engine 622. Model training engine 622 may store the combined data as another training data example within model related data store 606. The new training data example may be subsequently used to update and/or retrain the machine-learning model(s). In some embodiments, the image processing engine 624 may be configured to provide the image and/or output obtained from the model(s) to validation engine 626.

Validation engine 626 may be configured to obtain historical data from historical data store 610. In some embodiments, validation engine 626 may utilize the output provided by the image processing engine (e.g., output(s) 312 of FIG. 3) to identify specific data originally depicted in the image. By way of example, validation engine 626 may identify from the output a value corresponding to a data type associated with a data provider identifier (e.g., a data provider name, an address of a data provider, contact information associated with a data provider, etc.). The validation engine 626 may use the value as a lookup identifier with which historical data store 610 may be searched. Any suitable data corresponding to the value may be obtained from the search. Once obtained the historical data (e.g., data provider attributes associated with the lookup identifier) may be used to validate any suitable number of the textual data instances identified within the image. For example, an address of a data provider that was obtained from historical data store 610 may be compared to a textual data instance of the image that was identified by the model as being associated with a data provider address data type. In some embodiment, the validation engine 626 may be configured to determine that the textual data extracted from the image is valid when the extracted textual data matches the historical data corresponding to the data provider. The validation engine 626 may be configured to determine that the textual data extracted from the image is invalid when the extracted textual data fails to match the historical data corresponding to the data provider. In some embodiments, the historical data store 610 may include data corresponding to a user (e.g., an account holder) or any suitable number of users (e.g., account holders), or an entity (e.g., a data management provider such as a financial institution).

In some embodiments the validation engine 626 may be configured to invoke (e.g., by executing a function call, method call, application programming interface call, or the like) functionality of the interface manager 630 to solicit and/or obtain user input via one or more user interfaces managed by the interface manager 630. In some embodiments, the user input may include a confirmation that the textual data instance values, locations, and/or data types identified by the model are accurate. The validation engine 626 may be configured to add any suitable user input to a training data example corresponding to the image (e.g., a training data example corresponding to the image and stored in model related data store 606).

The workflow coordination engine 628 may be configured with computer-executable instructions that, when executed, initiate one or more workflows using any suitable portion of the textual data instances (e.g., values, locations, and/or data types of text identified within the image). Workflow coordination engine 628 may include functionality to communicate with one or more user device(s) (e.g., data provider computer(s) 506 of FIG. 5, service provider computer(s) 508 of FIG. 5, user device(s) 510 of FIG. 5, etc.) via one or more network(s) (e.g., network(s) 516 of FIG. 5).

In some embodiments the workflow coordination engine 628 may be configured to invoke (e.g., by executing a function call, method call, application programming interface call, or the like) functionality of the interface manager 630 to solicit and/or obtain user input via one or more user interfaces managed by the interface manager 630. In some embodiments, the user input may include a confirmation of whether a particular workflow should be initiated. Example workflows may include a workflow for transmitting one or more data messages, executing one or more processes, approving/rejecting a request to transmit one or more data messages and/or execute one or more processes, or the like. In some embodiments, workflow coordination engine 628 may be configured to transmit one or more notifications (e.g., data messages) to one or more user devices (e.g., user device(s) 510 of FIG. 5) at any suitable time.

The interface manager 630 may be configured with computer-executable instructions that, when executed, manage one or more user interfaces. In some embodiments, the one or more user interfaces may be configured to obtain and/or present images, obtain used input identifying textual data instance values/locations/data types of text depicted within an image, obtain an approval or rejection of textual data instance values/locations/data types of text that has been identified within an image by the machine-learning model(s), obtain an approval or rejection of a workflow initiation request, present one or more notifications associated with any suitable combination of the textual data instance values/locations/data types identified within the image and/or one or more workflows, or any suitable combination of the above.

Figure 7:
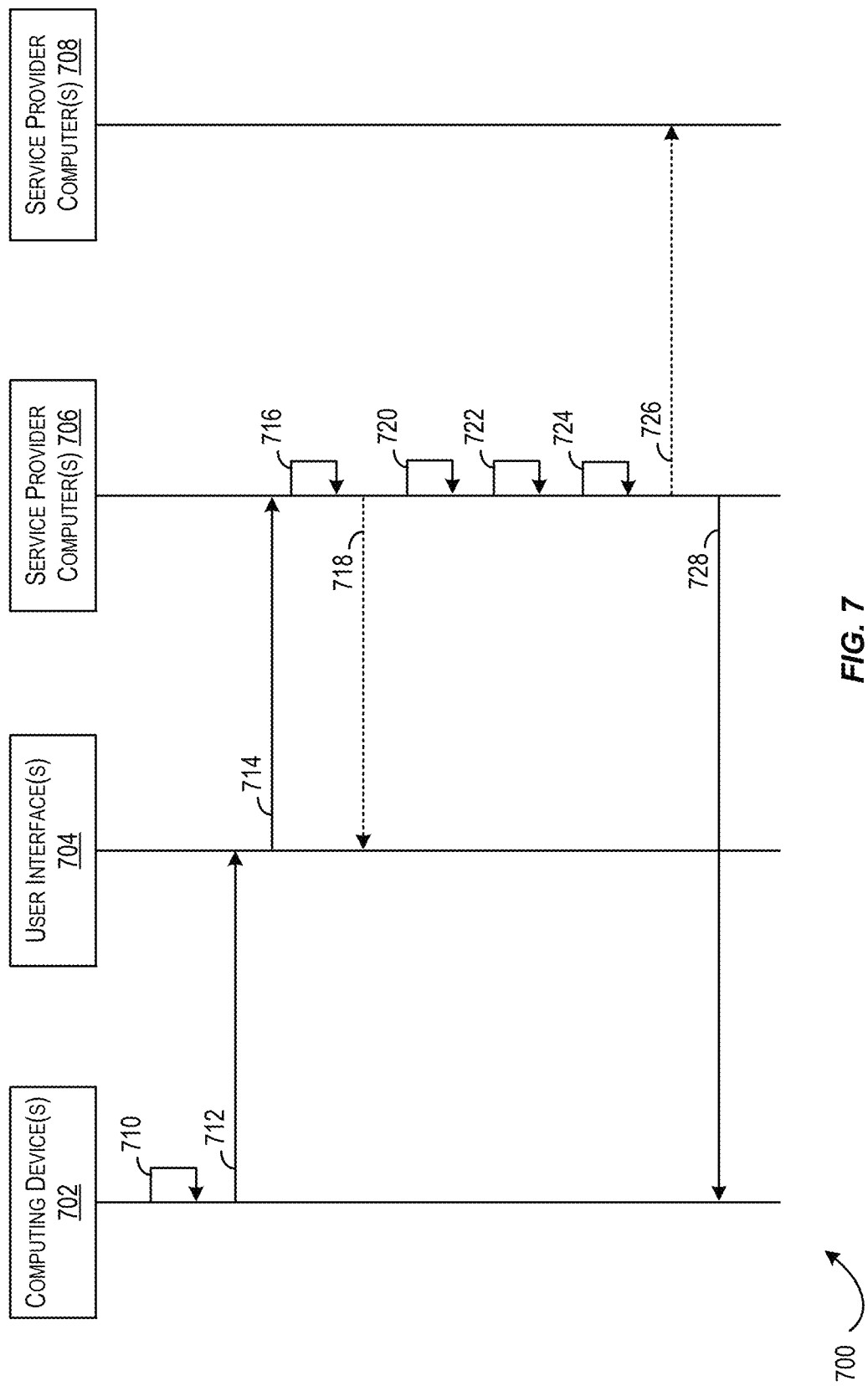
FIG. 7 is a swim diagram illustrating an example computing component interactions associated with a method for identifying data of an unstructured image and initiating operations based at least in part on the identified data, in accordance with at least one embodiment.

FIG. 7 is a swim diagram illustrating an example computing component interactions associated with a method 700 (e.g., a process) for identifying and classifying textual data of an unstructured image and initiating operations based at least in part on the classified data, in accordance with at least one embodiment. The method 700 may be performed by any suitable combination of computing device(s) 702 (e.g., user device(s) 510 of FIG. 5), service provider computer(s) 706 (e.g., service provider computer(s) 504 of FIG. 5), service provider computer(s) 102 of FIG. 1), and service provider computer(s) 708 (e.g., the service provider computer(s) 508 of FIG. 5). The computing device(s) 702, service provider computer(s) 706, and service provider computer(s) 708 may communicate with one another using one or more networks (e.g., network(s) 516 of FIG. 5, a cellular network, the Internet, etc.).

The method 700 may being at 710, where computing device(s) 702 may be used to navigate (e.g., via an application or web browser) to user interface(s) 704. In some embodiments, user interface(s) 704 may be managed by service provider computer(s) 706. By way of example, user interface(s) 704 may be provided by service provider computer(s) 706 as part of bill pay functionality provided as part of an online user account. The computing device(s) 702 may be a desktop computer, a server computer, a mobile device, a tablet, a smartphone, or the like.

At 712, computing device(s) 702 may be used to upload or otherwise provide or capture an image (e.g., image 112 of FIG. 1, image 202 or 204 of FIG. 2, etc.) using user interface(s) 704. In some embodiments, the image may be of a document provided by a data provider (e.g., a utility service provider, a medical service provider, a merchant, or the like). The document may correspond to an invoice/bill and may depict any suitable attributes corresponding to a user (e.g., user data attribute(s) 230 of FIG. 2, corresponding to an account holder of a financial account managed by service provider computer(s) 706), any suitable attributes corresponding to the data provider (e.g., data provider attribute(s) 232 of FIG. 2), a due date (e.g., date 212 of FIG. 2), a current amount owed (e.g., value 214 of FIG. 2), a previous balance (e.g., value 216 of FIG. 2), one or more previously paid amounts (e.g., value 218 of FIG. 2), one or more adjustment values (e.g., a charge or credit corresponding to value 220 of FIG. 2), one or more current charges (e.g., value 222 of FIG. 2), and one or more total amount owed (e.g., value 224 of FIG. 2), or any suitable data related to a bill or invoice.

At 714, service provider computer(s) 706 may obtain the image via user interface(s) 704.

At 716, service provider computer(s) 706 may provide the image to a machine-learning model (e.g., model 106, machine-learning model(s) 302 of FIG. 3, neural network 400 of FIG. 4, etc.). The machine-learning model may be previously trained (e.g., by the service provider computer(s) 706 or another suitable system or device) to identify textual data instances within the image. Identifying textual data instances may include identifying a location, a value, and a corresponding data type for each textual data instance. In some embodiments, obtaining the machine-learning model may include training the model using any suitable portion of the training data 304 of FIG. 3 and a machine-learning algorithm (e.g., a supervised machine-learning algorithm, an unsupervised machine-learning algorithm, etc.). The model may be trained (e.g., utilizing training phase 310 of FIG. 3) prior to the execution of method 700. In some embodiments, the image may be provided by the service provider computer(s) 706 to neural network 400 of FIG. 4 and a feature vector generated from the image by the neural network 400 may be obtained. Identifying a location, a value, and a corresponding data type for each textual data instance depicted in the image may include providing the image and/or feature vector to the machine-learning model as input.

In some embodiments, the user may be prompted for user annotations for the image at 718. User annotations may be provided via user interface(s) 704 and may identify any suitable combination of the value, location, and/or data type of a textual data instance depicted within an image. These user annotations may be provided after uploading the image via user interface(s) 704. In some embodiments, a user may be prompted only when attributes of the data provider are unknown. As a non-limiting example, the user may be prompted for annotations the first time an image for a given data provider is processed (e.g., when no user has uploaded an image corresponding to this data provider). In some embodiments, the user may be prompted for annotations at any suitable time to confirm the accuracy of the values, locations, and/or data types identified by the model at 716. In some embodiments, the user's annotations may be utilized with the image as training data with which the model may be trained and/or updated at any suitable time. For example, the user annotations may be obtained as part of feedback procedure 314 of FIG. 3. If a textual data instance is identified by the model but the model is unable to classify the textual data instance as being of a particular data type, the user may be presented the value corresponding to the textual data instance and prompted to supply the corresponding data type. Any suitable user input (annotations, data types, values, etc.) provided by the user via user interface(s) 704, with the image or by request of the service provider computer(s) 706 may be used with the image as training data with which the model may be trained and/or updated at any suitable time.

At 720, values corresponding to the textual data instances identified at 716 may be validated against data associated with the data provider and/or data associated with the user. By way of example, data associated with the data provider may be previously stored based at least in part on user input provided by the user of computing device(s) 702 and/or a user associated with an account managed by the service provider computer(s) 706. As a non-limiting example, a user corresponding to an account holder corresponding to an account identifier depicted in the image, or a user of a different account may provide user input comprising the data associated with the data provider (e.g., a merchant, a biller, a service provider, etc.) at any suitable time prior to executing the operations at 718. In some embodiments, one or more values identified in the image may be used to retrieve the data associated with the data provider. By way of example, a value corresponding to a textual data instance that was identified by the model as corresponding to a data type indicating the value is a data provider identifier may be used as a lookup value for previously stored data (e.g., all previously-provided data provider attributes). In some embodiments, the data provider identifier may be utilized to identify whether the instant user (e.g., the user corresponding to the account holder of an account corresponding to an account identifier depicted within the image) has previously conducted a transaction (e.g., a payment transaction) with the data provider. In some embodiments (e.g., when the user has not previously transacted with the data provider), the data provider identifier may be utilized to identify whether any user (e.g., user corresponding to account holders of accounts that do not correspond to the account identifier depicted within the image) have previously conducted a transaction (e.g., a payment transaction) with the data provider.

If data associated with the data provider is identified, validating the values of the textual data instances may include matching the values to corresponding data values of the data associated with the data provider. As a non-limiting example, the data providers name (a value identified by the model as being associated with a data type corresponding to a data provider's name) as depicted within the image may be compared with the data provider's name as stored in the data associated with the data provider. If a match is identified the value may be deemed valid. If the values do not match, the value may be deemed invalid. In some embodiments, any suitable combination of the values depicted in and identified from the image may be validated against any suitable combination of the values provided in the data associated with the data provider.

If data associated with the data provider has not previously been provided by this or another user, the service provider computer(s) 706 may prompt the user for such information via user interface(s) 704. Therefore, in some embodiments, validating the values of the textual data instances may include obtaining user input comprising one or more attributes associated with the data provider.

As another non-limiting example, a value corresponding to a textual data instance that was identified by the model may be compared to attributes associated with the user (e.g., account data such as a name, an address, an account identifier, contact information, or the like). In some embodiments, validating the values of the textual data instances may include matching the value of the textual data instance depicted in the image and identified by the model to known user attributes (e.g., values of the user's account data). As a non-limiting example, the account identifier (a value identified by the model as being associated with a data type corresponding to account identifier) may be compared with the account identifier of the user's account data. If a match is identified the value of that textual data instance may be deemed valid. If the values do not match, the value that textual data instance may be deemed invalid. In some embodiments, any suitable combination of the values depicted in and identified from the image may be validated against any suitable combination of the values associated with the user. As another example, a current amount owed (e.g., a value identified by the model from the image as corresponding to a current amount owed data type) may be compared to historical owed amounts and/or payment amounts of historical transactions. In some embodiments, if the current amount owed breached a difference threshold with respect to one or more previous amounts owed and/or payment amounts of historical transactions associated with the data provider, the current amount owed may be deemed invalid. Conversely, if the if the current amount owed falls within a difference threshold with respect to one or more previous amounts owed and/or one or more payment amounts of historical transactions associated with the data provider, the current amount owed may be deemed valid.

In some embodiments, the service provider computer(s) 706 may be configured to determine that the process for identifying/extracting the textual data instances from the image was successful when at least a threshold number/percentage of the textual data instance values match corresponding data provider and/or user attributes. If the values of the textual data instances identified/extracted from the image do not match at least a threshold number/percentage of corresponding data provider and/or user attributes, the identification process may be deemed a failure and the method 700 may cease. In some embodiments, determining that the identification/extraction process has failed may cause a notification to be provided (e.g. transmitted) to computing device(s) 702 via any suitable electronic message and/or the user interface(s) 704. If the identification/extraction process is determined to have been successful, the method 700 may continue to 722.

At 722, the service provider computer(s) 706 may be configured to select one or more processes from a plurality of automated processes. In some embodiments, this may include identifying an approved process type that is associated with the data provider. As a non-limiting example, the data provider may (e.g. through a previous registration process) indicate that a particular transaction channel and/or automated process is approved. By way of example a data provider may be associated with an indicator (e.g., an approved process type) that indicates the data provider accepts electronic payments. In some embodiments, the approved process type may indicate that the data provider does not accept electronic payments and a financial instrument (e.g., a check, a cashier's check, etc.) must be utilized. When the approved process type indicates that the data provider accepts electronic payments an automated process for performing an electronic payment may be selected from the plurality of automated processes. When the approved process type indicates that the data provider does not electronic payments an automated process for issue a payment via a financial instrument (e.g., a check, money order, cashier's check, etc.) may be selected from the plurality of automated processes.

At 724, one or more messages (e.g., data message 124 of FIG. 1) may be generated according to the selected process. Generating the one or more messages (e.g., one or more messages associated with conducting a payment transaction, one or more messages associated with drafting and/or sending a financial instrument) may include populating the one or messages with any suitable value of the values corresponding to the textual data instances identified in the image.

At 726, when the approved process type indicates electronic payments are accepted, the one or more messages (including the values identified from the image) may be transmitted to service provider computer(s) 708. Service provider computer(s) 708 may be one or more computing devices of a payment processing system and the one or more messages may include an authorization request message that initiates a payment transaction with the values identified/extracted from the image. The one or more messages may further include any suitable account data associated with the user such as an account identifier with which the transaction is to be performed.

At 728, the service provider computer(s) 706 may provide a notification or status of the automated process. The notification and/or status may be presented at the user interface(s) 704 and/or otherwise transmitted to the computing device(s) 702 via email and/or text message.

Figure 8:
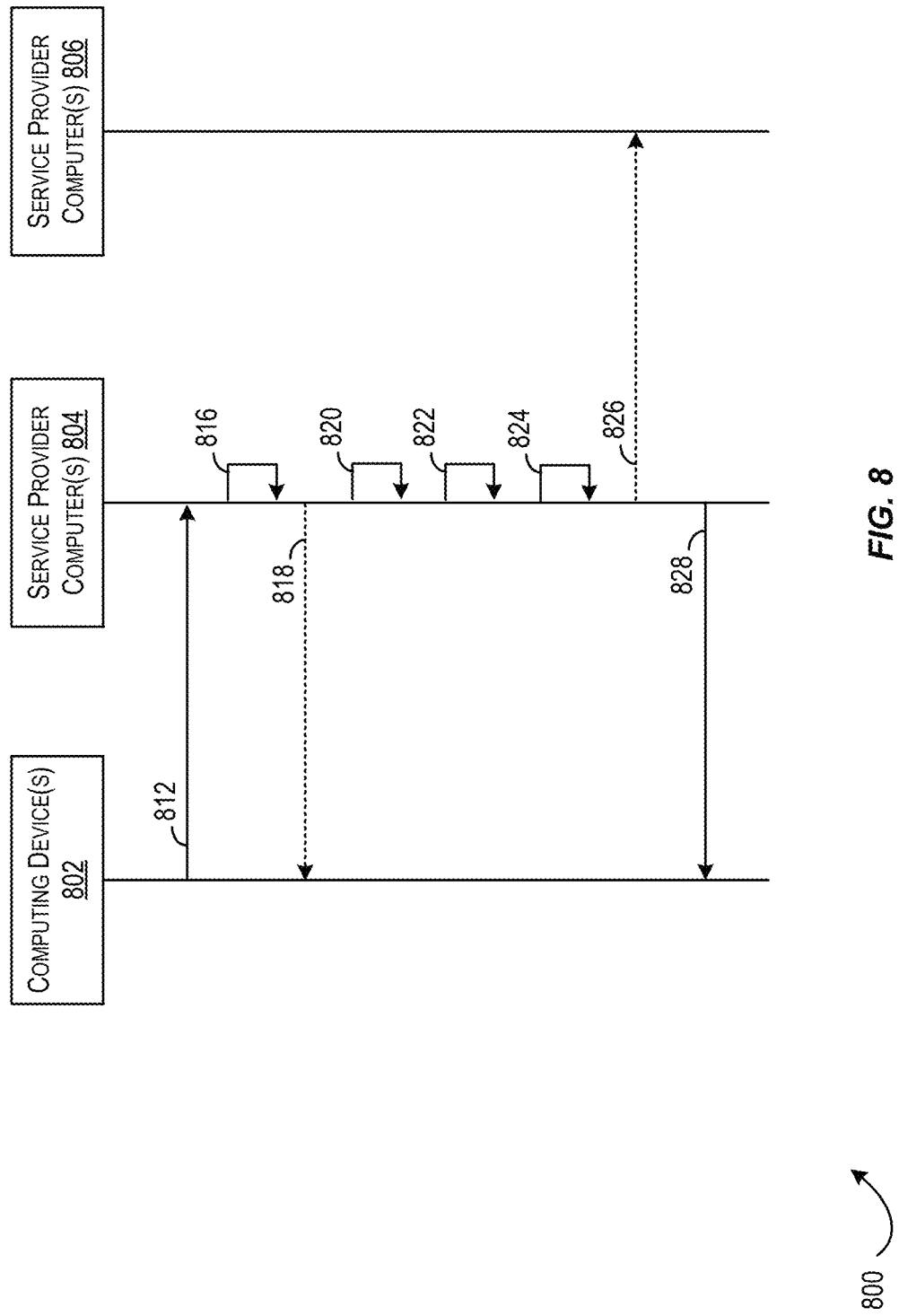
FIG. 8 is a swim diagram illustrating example computing component interactions associated with another method for identifying data of an unstructured image and initiating operations based at least in part on the identified data, in accordance with at least one embodiment.

FIG. 8 is a swim diagram illustrating example computing component interactions associated with another method 800 for identifying and classifying textual data of an unstructured image and initiating operations based at least in part on the classified data, in accordance with at least one embodiment. The method 800 may be performed by any suitable combination of computing device(s) 802 (e.g., computing device(s) 702 of FIG. 7, user device(s) 510 of FIG. 5, user device(s) 126 of FIG. 1, data provider computer(s) 506 of FIG. 5, etc.), service provider computer(s) 804 (e.g., service provider computer(s) 706 of FIG. 7, service provider computer(s) 504 of FIG. 5, service provider computer(s) 102 of FIG. 1, etc.), and service provider computer(s) 806 (e.g., the service provider computer(s) 708 of FIG. 7, the service provider computer(s) 508 of FIG. 5, etc.). The computing device(s) 802, service provider computer(s) 804, and service provider computer(s) 806 may communicate with one another using one or more networks (e.g., network(s) 516 of FIG. 5, a cellular network, the Internet, etc.).

The method 800 may being at 812, where computing device(s) 702 may transmit or otherwise provide an image (e.g., image 112 of FIG. 1, image 202 or 204 of FIG. 2, etc.) to service provider computer(s) 804. In some embodiments, the image may be of a document provided by a data provider (e.g., a utility service provider, a medical service provider, etc.). Similar to the document described in connection with FIG. 7, the document from which the image is generated may correspond to an invoice/bill and may depict any suitable attributes corresponding to a user, any suitable attributes corresponding to the data provider, or any suitable attributes of the document or image (e.g., a due date, a previous balance, one or more previously paid amounts, one or more adjustment values, one or more current charges, and one or more total amount owed, etc.

In some embodiments, the computing device(s) 802 are an example of the user device(s) 510 and the image may be provided by the user as an attachment to an email message. As another example the computing device(s) 802 may be an example of the data provider computer(s) 506. In some embodiments, the user may navigate to a website associated with the data provider to initiate a process in which the data provider computer(s) 506 may periodically (e.g., monthly, bimonthly, quarterly, etc.) transmit (e.g., via email message and/or application programming interface call) an image to service provider computer(s) 804 for processing. In some embodiments, transmitting the image at 812 may initiate a process that causes service provider computer(s) 804 to periodically request images from computing device(s) 802.

The operations performed at 816-828 may correspond to the operations performed at 716-728 as discussed above in connection with FIG. 7 and are not repeated here, for brevity.

Figure 9:
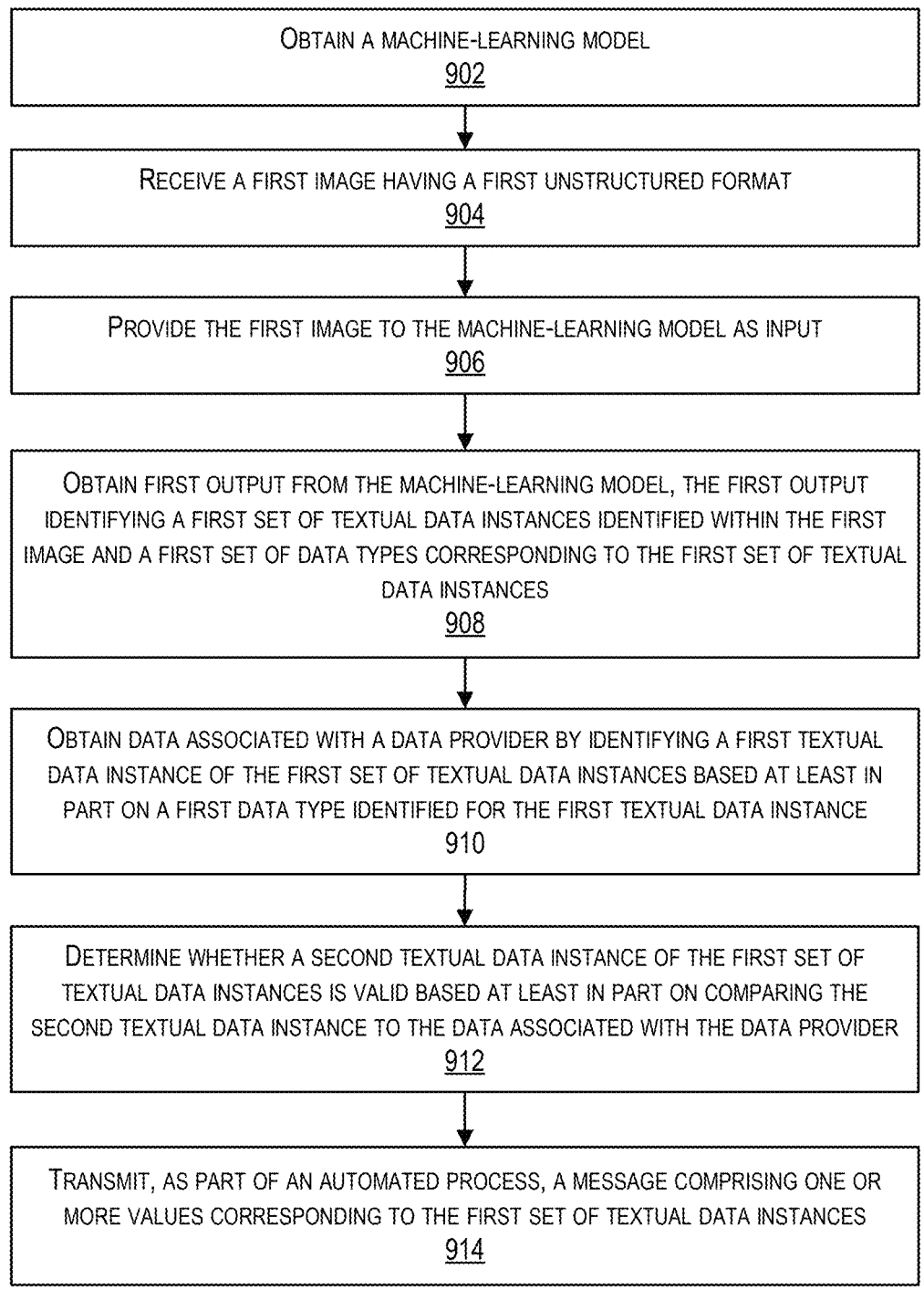
FIG. 9 is a block diagram illustrating an example method for identifying and utilizing unstructured data from an input image to perform an automated process, in accordance with at least one embodiment.

FIG. 9 is a block diagram illustrating an example method 900 for identifying and utilizing unstructured data from an input image to perform an automated process, in accordance with at least one embodiment. A non-transitory computer-readable storage medium may store computer-executable instructions that, when executed by at least one processor, cause at least one computer to perform instructions comprising the operations of the method 900. It should be appreciated that the operations of the method 900 may be performed in any suitable order, not necessarily the order depicted in FIG. 9. Further, the method 900 may include additional, or fewer operations than those depicted in FIG. 9. The operations of method 900 may be performed by any suitable portion of the identification and management engine 600 of FIG. 6 and/or identification and management engine 502 of FIG. 5 which may include one or more computing devices such as computing device 518 of FIG. 5 (e.g., service provider computer(s) 102 of FIG. 1).

The method 900 may being at 902, where a machine-learning model (e.g., model 106 of FIG. 1, machine-learning model(s) 302 of FIG. 3, etc.) may be obtained. The machine-learning model may be previously trained to identify a set of textual data instances within an input image and data types corresponding to the set of textual data instances. In some embodiments, obtaining the machine-learning model may comprise training the machine-learning model (e.g., using the method 300 of FIG. 3) to identify a set of textual data instances within an input image and data types corresponding to the set of textual data instances. In some embodiments, the machine-learning model may be trained utilizing a machine-learning algorithm and a training data set (e.g., training data 304 of FIG. 3) comprising example images of a plurality of unstructured formats. Each example may identify corresponding textual data instances within an image of an unstructured format of the plurality of unstructured formats and corresponding data types of the corresponding textual data instances. In some embodiments, an example may comprise a feature vector (e.g., feature vector 404 of FIG. 4) generated for the image.

At 904, a first image (e.g., image 202 of FIG. 2) having a first unstructured format may be received. In some embodiments, the first image may be received from data provider computer(s) 506 of FIG. 5 or user device(s) 510 of FIG. 5. The first image may be provided to the machine-learning model as input at 906. In some embodiments, the image may be provided to a second machine-learning model (e.g., neural network 400 of FIG. 4) to generate a feature vector for the image and the feature vector for the image may be provided as input to the machine-learning model with or in lieu of the image.

At 908, first output (e.g. output(s) 312 of FIG. 3) may be obtained from the machine-learning model. In some embodiments, the first output identifies a first set of textual data instances identified within the first image (e.g., data 208-232 of FIG. 2) and a first set of data types corresponding to the first set of textual data instances.

At 910, data associated with a data provider may be obtained as discussed in connection with FIG. 7. By way of example, a first textual data instance of the first set of textual data instances may be identified based at least in part on a first data type identified for the first textual data instance.

At 912, the computing device may perform operations for determining whether a second textual data instance of the first set of textual data instances is valid based at least in part on comparing the second textual data instance to the data associated with the data provider as discussed above in connection with FIG. 7.

At 914, based at least in part on determining that the second textual data instance is valid, transmitting, by the computing device (e.g., to the service provider computer(s) 508 of FIG. 5, the service provider computer(s) 708 of FIG. 7, the service provider computer(s) 806 of FIG. 8, etc.), a message (e.g., data message 124 of FIG. 1) comprising one or more values corresponding to the first set of textual data instances. In some embodiments, the message may be transmitted as part of executing an automated process.

The various embodiments further can be implemented in a wide variety of operating environments, which in some cases can include one or more user computers, computing devices or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft® Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random-access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Where terms are used without explicit definition as recited herein, it is understood that the ordinary meaning of the word is intended, unless a term carries a special meaning in the field of anomaly detection or other relevant fields. The terms "about" or "substantially", "similar to", "similar", "approximately" are used to indicate a deviation from the stated property or numerical value within which the deviation has little to no influence of the corresponding function, property, or attribute of the structure being described. In an illustrated example, where a dimensional parameter is described as "substantially equal" to another dimensional parameter, the term "substantially" is intended to reflect that the two dimensions being compared can be unequal within a tolerable limit, such as a fabrication tolerance. In the present disclosure, "ranges" refers to a range of values between the two stated extents and/or including one of the two stated extents.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   obtaining, by a computing device, a machine-learning model that has been trained to identify a set of textual data instances within an input image and data types corresponding to the set of textual data instances, the machine-learning model being previously trained utilizing a machine-learning algorithm and a training data set comprising example images of a plurality of unstructured formats, each example identifying corresponding textual data instances within an image of an unstructured format of the plurality of unstructured formats and corresponding data types of the corresponding textual data instances;
   receiving, by the computing device, a first image having a first unstructured format;
   providing, by the computing device, the first image as input to the machine-learning model;
   obtaining, by the computing device, first output from the machine-learning model, the first output identifying a first set of textual data instances identified within the first image and a first set of data types corresponding to the first set of textual data instances;
   obtaining, by the computing device, data associated with a data provider by identifying a first textual data instance of the first set of textual data instances based at least in part on a first data type identified for the first textual data instance;
   determining, by the computing device, whether a second textual data instance of the first set of textual data instances is valid based at least in part on comparing the second textual data instance to the data associated with the data provider;
   generating, by the computing device, a message comprising one or more values corresponding to the first set of textual data instances and a transaction authorization for an account associated with the first image; and
   based at least in part on determining that the second textual data instance is valid, transmitting, by the computing device, the message comprising the one or more values corresponding to the first set of textual data instances, the message being transmitted as part of executing an automated process.

2. The computer-implemented method of claim 1, wherein determining whether the second textual data instance of the first set of textual data instances is valid comprises determining whether a value of the second textual data instance matches a corresponding value of the data associated with the data provider.

3. The computer-implemented method of claim 1, wherein determining whether the second textual data instance of the first set of textual data instances is valid comprises:
   obtaining user input comprising the data that is associated with the data provider; and
   storing the data that is associated with the data provider for subsequent use.

4. The computer-implemented method of claim 1, wherein the first image is received, via an email message or via an application programming interface, from a second computing device different from the computing device.

5. The computer-implemented method of claim 1, wherein the automated process is one of a plurality of automated processes, and wherein the computer-implemented method further comprises:

identifying, by the computing device and based at least in part on the data that is associated with the data provider, an approved process type; and based at least in part on determining that the approved process type matches a process type associated with the automated process, selecting the automated process from the plurality of automated processes.

6. The computer-implemented method of claim 1, further comprising:

receiving, by the computing device, a second image having a second unstructured format;

providing, by the computing device, the second image as subsequent input to the machine-learning model; and obtaining, by the computing device, second output from the machine-learning model, the second output identifying a second set of textual data instances identified within the second image, wherein the first textual data instance of the first set of textual data instances and a second textual data instance of the second set of textual data instances corresponds to a common textual data type, and wherein the first image and the second image have different unstructured formats.

7. The computer-implemented method of claim 1, wherein the first image is one of a plurality of images obtained by the computing device over a time period, wherein the computing device obtains the plurality of images based at least in part on receiving user input indicating a periodicity at which images are to be requested from a second computing device.

8. A computing device, comprising:

one or more processors; and one or more memories storing computer-executable instructions that, when executed by the one or more processors, causes the one or more processors to:

train a machine-learning model to identify a set of textual data instances within an input image and data types corresponding to the set of textual data instances, the machine-learning model being trained utilizing a machine-learning algorithm and a data set comprising textual data instances depicted within an image of an unstructured format of a plurality of unstructured formats, a textual data instance corresponding to one of a plurality of data types;

obtain a first image having a first unstructured format;

provide the first image as input to the machine-learning model;

obtain first output from the machine-learning model, the first output identifying a first set of textual data instances identified within the first image and a first set of data types corresponding to the first set of textual data instances;

obtain data associated with a data provider by identifying a first textual data instance of the first set of textual data instances based at least in part on a first data type identified for the first textual data instance;

determine whether a second textual data instance of the first set of textual data instances is valid based at least in part on comparing the second textual data instance to the data associated with the data provider;

generate a message comprising one or more values corresponding to the first set of textual data instances and a transaction authorization for an account associated with the first image; and based at least in part on determining that the second textual data instance is valid, transmit the message comprising the one or more values corresponding to the first set of textual data instances, the message being transmitted as part of executing an automated process.

9. The computing device of claim 8, wherein executing the computer-executable instructions that determine whether the second textual data instance of the first set of textual data instances is valid, further causes the one or more processors to:

obtain user input comprising the data that is associated with the data provider; and store the data that is associated with the data provider for subsequent use.

10. The computing device of claim 8, wherein the first image is received, via an email message or via an application programming interface, from a second computing device different from the computing device.

11. The computing device of claim 8, wherein the automated process is one of a plurality of automated processes, and wherein executing the computer-executable instructions further causes the one or more processors to:

identify, based at least in part on the data that is associated with the data provider, an approved process type; and based at least in part on determining that the approved process type matches a process type associated with the automated process, select the automated process from the plurality of automated processes.

12. The computing device of claim 8, wherein executing the computer-executable instructions further causes the one or more processors to:

obtain a second image having a second unstructured format;

provide the second image as subsequent input to the machine-learning model; and obtain second output from the machine-learning model, the second output identifying a second set of textual data instances identified within the second image, wherein the first textual data instance of the first set of textual data instances and a second textual data instance of the second set of textual data instances corresponds to a common textual data type, and wherein the first image and the second image have different unstructured formats.

13. The computing device of claim 8, wherein the first image is one of a plurality of images obtained by the computing device over a time period, wherein the computing device obtains the plurality of images based at least in part on receiving user input indicating a periodicity at which images are to be requested from a second computing device.

14. A non-transitory computer-readable storage medium storing computer-executable instructions that, when executed with one or more processors of a computing device, causes the one or more processors to:

train a machine-learning model to identify a set of textual data instances within an input image and data types corresponding to the set of textual data instances, the machine-learning model being trained utilizing a machine-learning algorithm and a training data set comprising textual data instances depicted within an image of an unstructured format of a plurality of unstructured formats, a textual data instance corresponding to one of a plurality of data types;

obtain a first image having a first unstructured format;

provide the first image as input to the machine-learning model;

obtain first output from the machine-learning model, the first output identifying a first set of textual data instances identified within the first image and a first set of data types corresponding to the first set of textual data instances;

obtain data associated with a data provider by identifying a first textual data instance of the first set of textual data instances based at least in part on a first data type identified for the first textual data instance;

determine whether a second textual data instance of the first set of textual data instances is valid based at least in part on comparing the second textual data instance to the data associated with the data provider;

generate a message comprising one or more values corresponding to the first set of textual data instances and a transaction authorization for an account associated with the first image; and based at least in part on determining that the second textual data instance is valid, transmit a message comprising the one or more values corresponding to the first set of textual data instances, the message being transmitted as part of executing an automated process.

15. The non-transitory computer-readable storage medium of claim 14, wherein executing the computer-executable instructions that determine whether the second textual data instance of the first set of textual data instances is valid comprises executing additional instructions that cause the one or more processors to determine whether a value of the second textual data instance matches a corresponding value of the data associated with the data provider.

16. The non-transitory computer-readable storage medium of claim 14, wherein executing the computer-executable instructions that determine whether the second textual data instance of the first set of textual data instances is valid, further causes the one or more processors to:

obtain user input comprising the data that is associated with the data provider; and store the data that is associated with the data provider for subsequent use.

17. The non-transitory computer-readable storage medium of claim 14, wherein the first image is received, via an email message or via an application programming interface, from a second computing device different from the computing device.

18. The non-transitory computer-readable storage medium of claim 14, wherein the automated process is one of a plurality of automated processes, and wherein executing the computer-executable instructions further causes the one or more processors to:

identify, based at least in part on the data that is associated with the data provider, an approved process type; and based at least in part on determining that the approved process type matches a process type associated with the automated process, select the automated process from the plurality of automated processes.

19. The non-transitory computer-readable storage medium of claim 14, wherein executing the computer-executable instructions further causes the one or more processors to:

obtain a second image having a second unstructured format;

provide the second image as subsequent input to the machine-learning model; and obtain second output from the machine-learning model, the second output identifying a second set of textual data instances identified within the second image, wherein the first textual data instance of the first set of textual data instances and a second textual data instance of the second set of textual data instances corresponds to a common textual data type, and wherein the first image and the second image have different unstructured formats.

20. The non-transitory computer-readable storage medium of claim 14, wherein the first image is one of a plurality of images obtained by the computing device over a time period, wherein the computing device obtains the plurality of images based at least in part on receiving user input indicating a periodicity at which images are to be requested from a second computing device.

* * * * *